United States Patent
Watson

(10) Patent No.: US 10,769,825 B1
(45) Date of Patent: *Sep. 8, 2020

(54) MATCHED ARRAY TALENT ALIGNMENT SYSTEM AND METHOD

(71) Applicant: EffectiveTalent Office LLC, Chicago, IL (US)

(72) Inventor: Craig M. Watson, Chicago, IL (US)

(73) Assignee: EffectiveTalent Office LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/875,024

(22) Filed: May 15, 2020

Related U.S. Application Data

(63) Continuation of application No. 16/785,745, filed on Feb. 10, 2020, now Pat. No. 10,657,684, which is a continuation of application No. 16/679,840, filed on Nov. 11, 2019.

(60) Provisional application No. 62/810,610, filed on Feb. 26, 2019, provisional application No. 62/781,915, filed on Dec. 19, 2018.

(51) Int. Cl.
G06T 11/20 (2006.01)
H04N 5/222 (2006.01)
G06T 19/00 (2011.01)

(52) U.S. Cl.
CPC .......... G06T 11/203 (2013.01); G06T 19/006 (2013.01); H04N 5/2224 (2013.01)

(58) Field of Classification Search
CPC .............................. G06T 11/203; G06F 16/258
See application file for complete search history.

(56) References Cited

U.S. PATENT DOCUMENTS 6,304,670 B1  10/2001  Berestov
7,036,085 B2   4/2006  Barros
(Continued)

OTHER PUBLICATIONS

Badr, "Why Feature Correlation Matters . . . A Lot!", Towards Data Science Inc., Jan. 18, 2019, downloaded from internet website: https://towardsdatascience.com/why-feature-correlation-matters-a-lot-847e8ba439c4 on Apr. 23, 2019, 8 pages.

Primary Examiner — Merilyn P Nguyen
(74) Attorney, Agent, or Firm — Faegre Drinker Biddle & Reath LLP

(57) ABSTRACT

A matched array technology system and method for displaying in a two-dimensional array the structured interaction between the expectations of manager and employee in an organization. Proxy values of employee and manager perspectives are defined and scaled so the axes of the array contain corresponding indicators resulting in a "matched array" and an embedded, unique "alignment vector" of the cells where employee and manager expectations are equivalent. The matched array display shows all possible manager and employee value intersections, and the geometry of the alignment vector designates optimal alignment between employee and manager for each stage of job performance from entry to advancement. The plotted position of an employee on the array in relation to its location and distance from the alignment vector measures employee performance, potential, and risk, and indicates the direction and extent of adjustment needed by either employee or manager to achieve and maintain alignment.

21 Claims, 9 Drawing Sheets

(56) References Cited

U.S. PATENT DOCUMENTS

| | | | |
|---|---|---|---|
| 7,630,986 B1 * | 12/2009 | Herz | G06Q 10/10 |
| 7,707,061 B2 | 4/2010 | van der Linde | |
| 7,904,848 B2 * | 3/2011 | Coene | G06F 9/5066 |
| | | | 716/126 |
| 9,292,857 B2 * | 3/2016 | Averbuch | G06Q 30/0201 |
| 9,483,162 B2 | 11/2016 | Mingione | |
| 9,788,031 B2 * | 10/2017 | Meyer | H04N 21/2407 |
| 10,157,173 B2 | 12/2018 | Villani | |
| 2006/0093222 A1 | 5/2006 | Saffer et al. | |
| 2010/0113159 A1 * | 5/2010 | Chapman | H04L 67/1029 |
| | | | 463/42 |
| 2012/0221788 A1 | 8/2012 | Raghunathan | |
| 2015/0077592 A1 | 3/2015 | Fahey | |
| 2017/0032017 A1 | 2/2017 | Morinaga et al. | |
| 2017/0053623 A1 * | 2/2017 | Purayil | G09G 5/377 |
| 2017/0090482 A1 | 3/2017 | Zammit-Mangion et al. | |
| 2017/0170968 A1 | 6/2017 | Zhang et al. | |
| 2018/0137541 A1 * | 5/2018 | Yelton | G06Q 30/0277 |
| 2018/0165254 A1 | 6/2018 | Talati | |
| 2018/0181693 A1 * | 6/2018 | Yang | E21B 41/0092 |
| 2018/0350116 A1 | 12/2018 | Ruble et al. | |

* cited by examiner

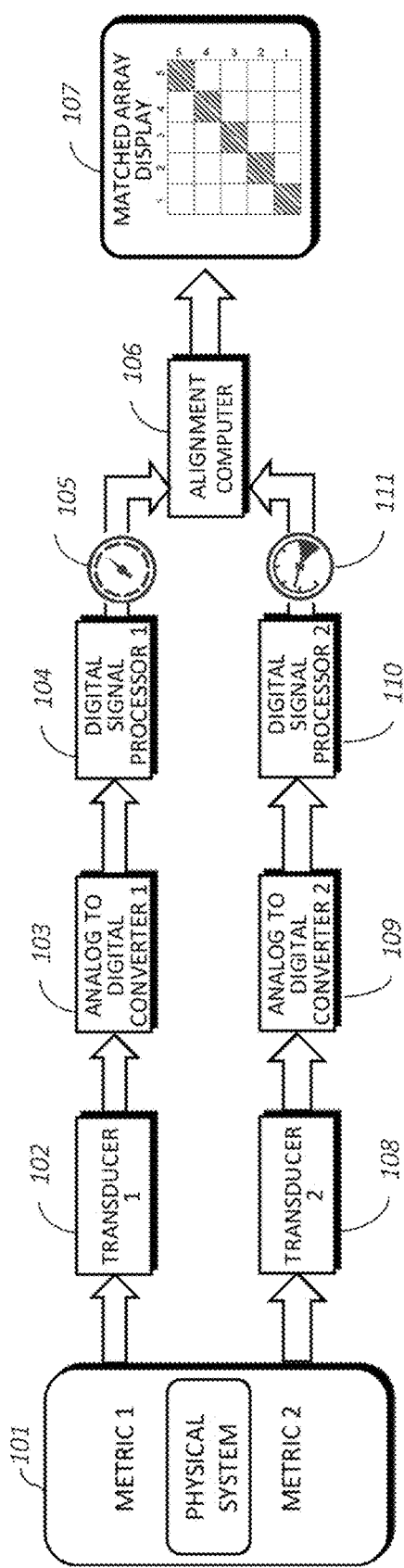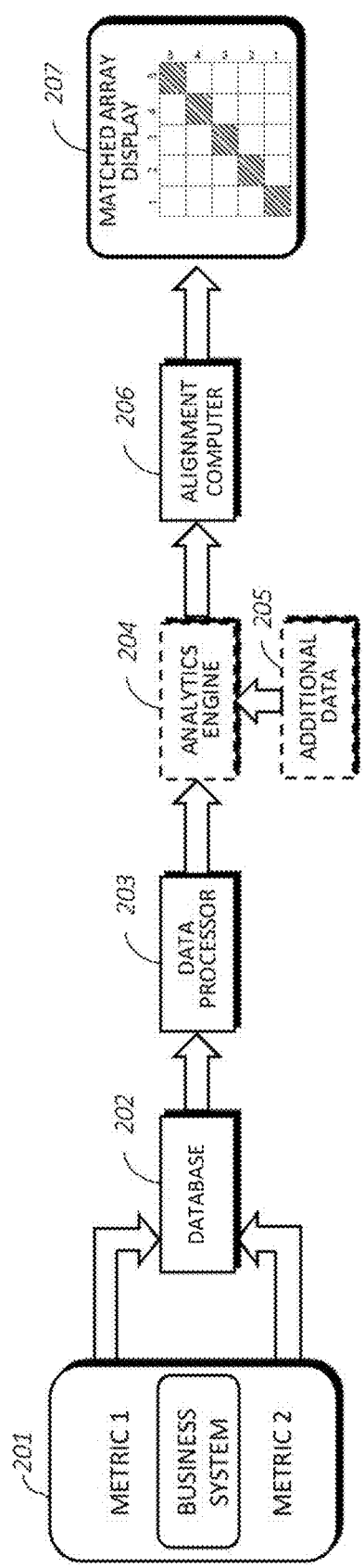

MATCHED ARRAY TALENT ALIGNMENT SYSTEM AND METHOD

CROSS-REFERENCE TO RELATED APPLICATIONS

The present application a continuation of U.S. patent application Ser. No. 16/785,745, filed on Feb. 10, 2020, now U.S. Pat. No. 10,657,684, which is a continuation of U.S. patent application Ser. No. 16/679,840, filed on Nov. 11, 2019, which claims the priority benefit of U.S. Provisional Patent Application No. 62/781,915, filed on Dec. 19, 2018, and U.S. Provisional Patent Application No. 62/810,610, filed on Feb. 26, 2019, each of which is incorporated herein by reference in its entirety.

TECHNICAL FIELD

The present disclosure is related generally to electronic display of optimal system performance, and more particularly to a method and computing system for aligning two variables to produce a target result.

BACKGROUND

A number of operational systems depend on the alignment of two different measures to efficiently or safely produce desired results. Such operations generally require a human operator's expertise and continual evaluation of the two different variables, often viewed on different gauges involving different metrics, and relying on measurement, experience, or "feel," to keep the system within operational parameters that yield the desired outcomes. Examples include chemical processes in which an exact and dynamic combination of heat and pressure is required to produce a specific compound, or aircraft flight operations in which an exact and dynamic combination of airspeed and angle-of-attack can mean the difference between a safe landing and loss of control. Such joint optimization situations involve coordinating the changing values of differently-measured variables, adjusting them together over a defined range, and keeping them within required bounds until target outcomes are achieved. Ordinarily, a significant effort is required to keep the operating variables aligned, and in some cases, failure to do so can result in a range of operating failures, including wasted product or even explosions in chemical environments; and accidents on takeoff and landing in flight.

Joint optimization problems extend to non-technical contexts as well. Wherever close coordination of two dimensions of a system is essential, the same requirements come into play. Investment portfolio management turns on optimizing risk and return across changing asset classes. Effective human resource management requires assessing whether employees are "meeting expectations." Here, optimizing alignment between management's expectations and employee's desire for advancement creates a joint optimization setting just as compelling as any engineering challenge.

DRAWINGS

While the appended claims set forth the features of the present techniques with particularity, these techniques may be best understood from the following detailed description taken in conjunction with the accompanying drawings of which:

FIG. 1 is a representation of a matched array system receiving physical input (e.g., pressure, heat, or electrical inputs from a system such as a chemical or mechanical system), according to an embodiment.

FIG. 2 is a representation of a matched array system receiving different data streams (from an administrative system), comparing them, and displaying them to optimize a process, according to an embodiment.

DETAILED DESCRIPTION

Figure 3:
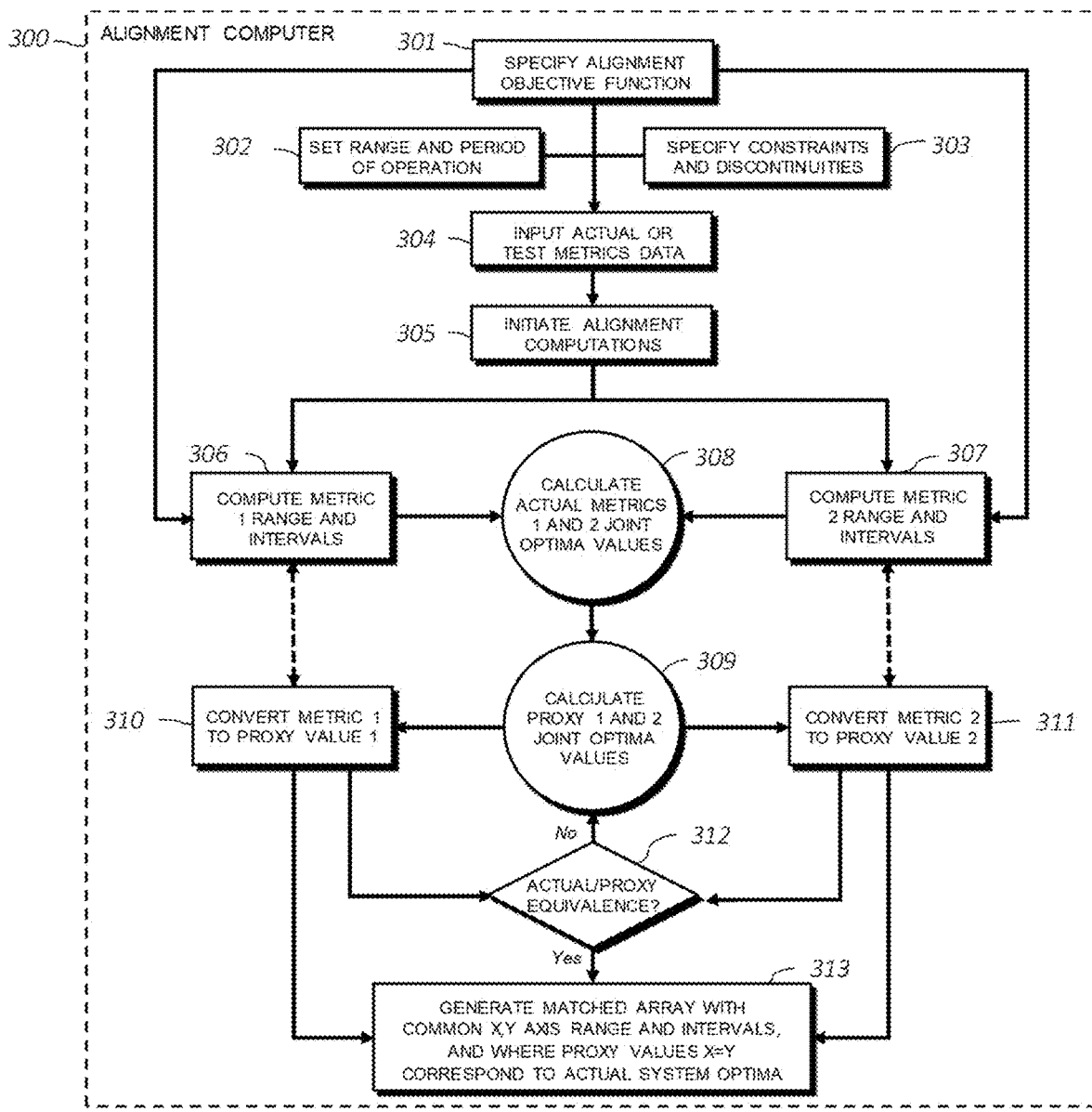
FIG. 3 is a process flow diagram showing steps involved in setting up a matched array system, according to an embodiment.

This disclosure is generally directed to a system and method for displaying (e.g., on a display device) in a two-dimensional array the structured interaction of two variables moving in tandem to achieve a target outcome (for example, balancing heat and pressure in a chemical reaction to yield a given compound). In various embodiments, the feasible values of the two system operating variables are represented by proxy values of X and Y scaled so that the range and interval of the X- and Y-axes are the same, and configured so that whenever the system is in an equilibrium or optimal state, the proxy value of X and equals the proxy value of Y. The resulting display has at least two distinct features: first, it forms a "matched array" of all operationally-relevant X,Y intersections, and second, the points at which the system is in equilibrium or at an optimum (the same points at which proxy values of X and Y are equal) all lie along a unique, clearly-delineated center diagonal of the displayed output (e.g., on a display device) referred to herein as the "alignment vector."

According to an embodiment, wherever on the display X and Y intersect, cells of the display can reflect several indicators of use to system operators: the values of the underlying operating variables, their proximity to the optimal position along the alignment vector, and the direction and extent of adjustments needed to reach the alignment vector to achieve optimal system performance. The presentation of the display can be on a display device (such as a computer monitor) including a matrix with shading and colors reflecting values relative to the alignment vector.

In an embodiment, the matched array system indicates the proximity to or distance from the optimal position of the X,Y values with an audible warning. In one implementation, the output is in an airplane cockpit instrument, in which the audio warnings sound when the X,Y intersection is dangerously far from the alignment vector, and with instructions on what to do to return to the desired flight path.

In an embodiment, the matched array system operates in two modes: normative, as in the above examples, in which the monitor or instrument provides information to be acted upon; and positive, in which the system, acting on the same information, automatically makes the needed adjustments to move the system toward the operating state represented by the alignment vector.

According to various embodiments, a "matched array" system and method facilitates coordinated achievement of joint optimization results using a computerized display system and method that combines the two different metrics in one display, and articulating optimal settings along a unique "alignment vector." The result is easier achievement of more consistently optimal performance, even by less experienced users.

Turning to FIG. 1, the operation of a matched array system according to an embodiment will now be described. In this embodiment, the matched array system receives physical input (e.g., pressure, heat, or electrical inputs from a system such as a chemical or mechanical system) from a physical system 101. The physical system 101 is similar to one that might be found in a chemical process in which the collected metrics indicate physical phenomena such a pressure, heat, or mechanical impulses. The physical input is received by a transducer 102, which translates it into analog electrical signals. These analog electrical signals are received by an analog-to-digital (A/D) converter 103, which converts the analog signals into digital signals. The digital signals are provided to a digital signal processor (DSP) 104, which processes (e.g., filters) the signals into a form that is usable by a meter 105 or other device for displaying measurements. The processed signal is also used by an alignment computer 106 (which can be implemented as a separate hardware processor such as a controller or microprocessor, or as a computing device such as that shown in FIG. 10) that analyzes the range of feasible values of x and (later) y to determine a corresponding set of proxy values that form the X and Y axes of a matrix display. The alignment computer 106 controls a display device 107 (to display a matched array). A parallel set of actions is taking place in in a second transducer 108, a second A/D converter 109, and a DSP 110, resulting in a signal 111 input to the alignment computer 106. The alignment computer 106 converts x and y metrics to proxy values that have the same range and interval on the X and Y axes, respectively. The display device 107 plots the proxy values as an intersection on the matched array (i.e., in response to actual metric 1 and 2 data received).

In FIG. 2, the operation of a matched array system according to an additional embodiment is illustrated. In this embodiment, the matched array system receives data (e.g., business or financial information) from a business system 201 (e.g., a computing device such as that shown in FIG. 10). A data base 202 receives metric 1 and metric 2 data from the business system and feeds them into a data processor 203 (e.g., a computing device such as that shown in FIG. 10) which modifies the data for meaningful manipulation in later stages (e.g., conversion to log numbers, multiplication by a relevant coefficient, formatting). In an embodiment, an additional optional step processes the two data elements through an analytics engine 204 that might also, for example, combine the data received with additional data 205, or otherwise enhance, interpret, or modify the data for processing by an alignment computer 206 (which can be implemented as a separate hardware processor such as a controller or microprocessor, or as a computing device such as that shown in FIG. 10). The alignment computer 206 converts the two variables to proxy values that have the same range and interval on the X and Y axes, respectively, enabling them to be plotted together on a matched array display 207.

Figure 10:
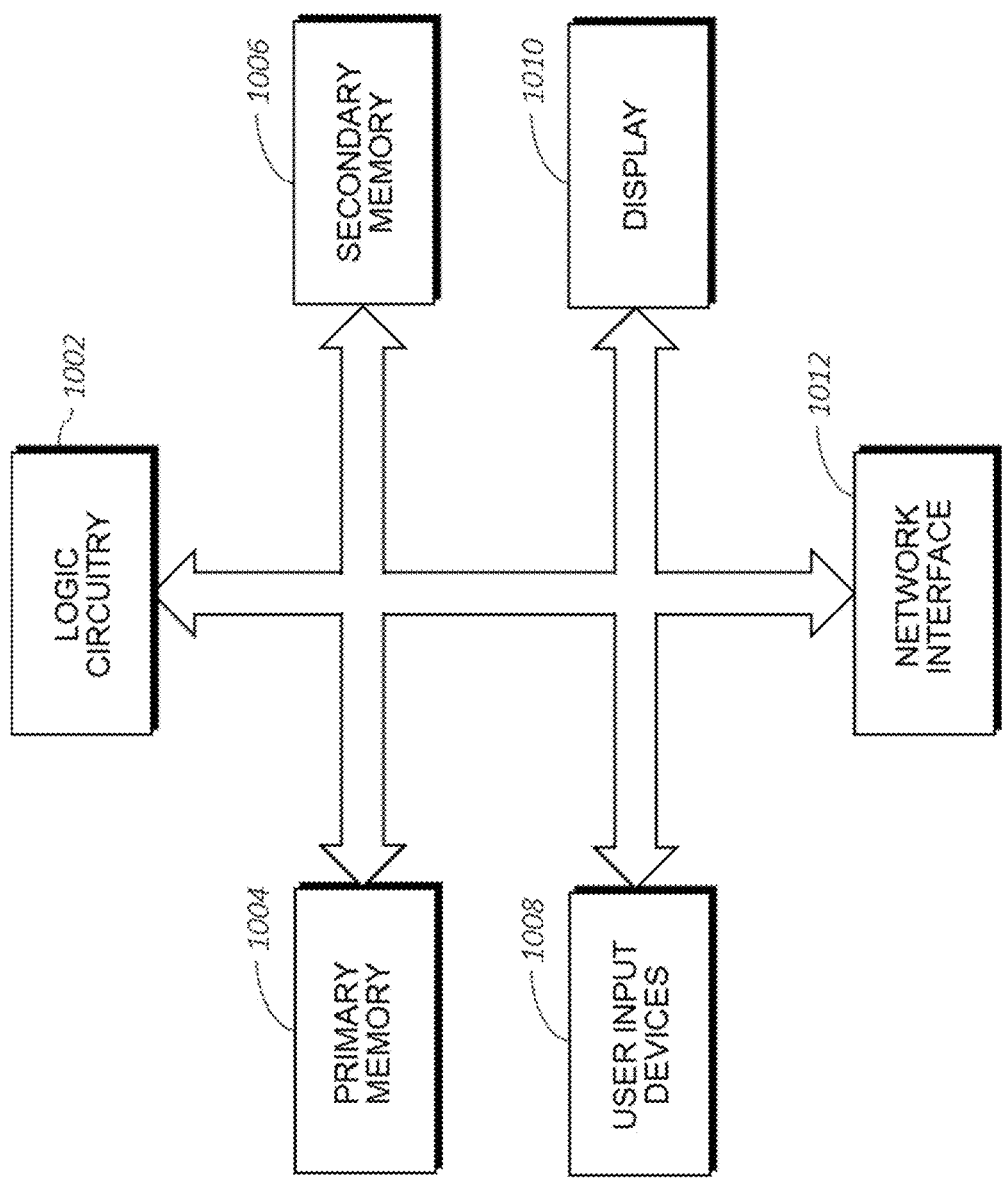
FIG. 10 shows a computing device on which the techniques described herein may be carried out.

FIG. 3 portrays an "alignment computer" 300 (which can be implemented as a separate hardware processor such as a controller or microprocessor, or as a computing device such as that shown in FIG. 10) and the series of actions it implements to calibrate the axes of the matched array system so that when the overall system is at an optimum or in equilibrium, proxy values for x and y are equal. The matched array system can portray optimum or equilibrium positions when two conditions are present: first, each proxy value axis X or Y must be able to represent the relevant range of the underlying operating metrics; and second, the range and interval of the proxy values are the same. When these conditions exist, intersection set x=y will lie along the center diagonal of a rectilinear array. When the system designer or alignment computer follows these guidelines, the matched array will be properly calibrated, and the settings will be applicable to the foreseeable functioning of the matched array system in much the same way that the scale of a car's speedometer does not have to be re-calibrated for each trip.

In an embodiment in FIG. 3, a system designer or a microprocessor sets three specific conditions that support alignment computer operations: the operating system objective function 301 (e.g., product yield, aircraft flight orientation), the range and period of operation of the underlying operating system 302, and any constraints and discontinuities 303 that apply to the metrics of the underlying operating system. Together, these settings ensure that the matched array system can search and calculate proxy values within the appropriate feasible range of values for x and y when a system operator, or alternatively a microprocessor or transducer, introduces test or actual operating data to the matched array system database 304. In an embodiment, after receiving the data, or alternatively concurrent with the receipt of data, a system operator may manually, or a microprocessor may automatically, initiate the alignment computer process 305 (e.g., an alignment process carried out on a controller or microprocessor, or computing device such as that shown in FIG. 10) based on the data received.

An alignment computer (which can be implemented as a separate hardware processor such as a controller or microprocessor, or as a computing device such as that shown in FIG. 10) begins calculating the eventual alignment between proxy values for the actual operating metrics by first computing the range and interval of operating system metrics 1 and 2 in steps 306 and 307. The alignment computer then calculates at step 308 the subset of matched operating metric settings for which values the underlying system is stable or optimal in achieving the objective function specified in 301. Using the range and intervals of the operating metrics 1 and 2 of the underlying system, and the specific joint optima computed in step 308, the matched array computer calculates in step 309 the set of optimal proxy value combinations corresponding to the optimal operating metrics 1 and 2. Working from this set of optimal x and y proxy values, and incorporating the range and intervals reflected in the actual operating data, the alignment computer converts metric 1 and 2 operating data to proxy values 1 and 2 at steps 310 and 311. For purposes of the matched array, this process computes the values along the center diagonal—the alignment vector—and then identifies all related values (optimal or not) along the X and Y axes. The alignment computer calculates proxy values iteratively, checking that the proxy values correspond to the optimal operating values in step 312, and stopping when the equivalence between proxy and operating values has been established, indicating that the condition of proxy value equality at x=y corresponds directly to the optimality of the underlying operating system values ("proxy-operating equivalence").

When the alignment computer has established proxy-operating equivalence in step 312, all the conditions for specifying the matched array display 313 are established:

a. the operating ranges and relevant intervals for metrics 1 and 2 have been identified;
b. the subset of operating ranges and relevant intervals of metrics 1 and 2 values for which the operating system is stable, optimized, or at equilibrium have been identified;
c. the corresponding set of optimal proxy values of metrics 1 and 2 have been designated and their equivalence to the optimal operating metrics validated;
d. the common range and interval for the X and Y axes of proxy values 1 and 2 have been specified, delineating a rectilinear matrix called a matched array;
e. every point at which proxy value x equals proxy value y represents an optimal or equilibrium state of the underlying operating system;
f. the range of values at which x=y designates the center diagonal of the matched array, called an "alignment vector."

The alignment computer generates a matched array display at block 313, including a matrix of feasible intersection points in the array of X and Y values, and a diagonal "alignment vector" of all intersection points for which the proxy value of x equals the proxy value of y. For any embodiment of the system in which the conditions and optima remain generally the same, this setup process is implemented once and its results will apply to all reasonably similar cases, in much the same way the settings on an instrument gauge are calibrated to reflect the known parameters and limits of the system being measured, then applied to all instruments produced, and used in all reasonably foreseeable operating conditions.

Figure 4:
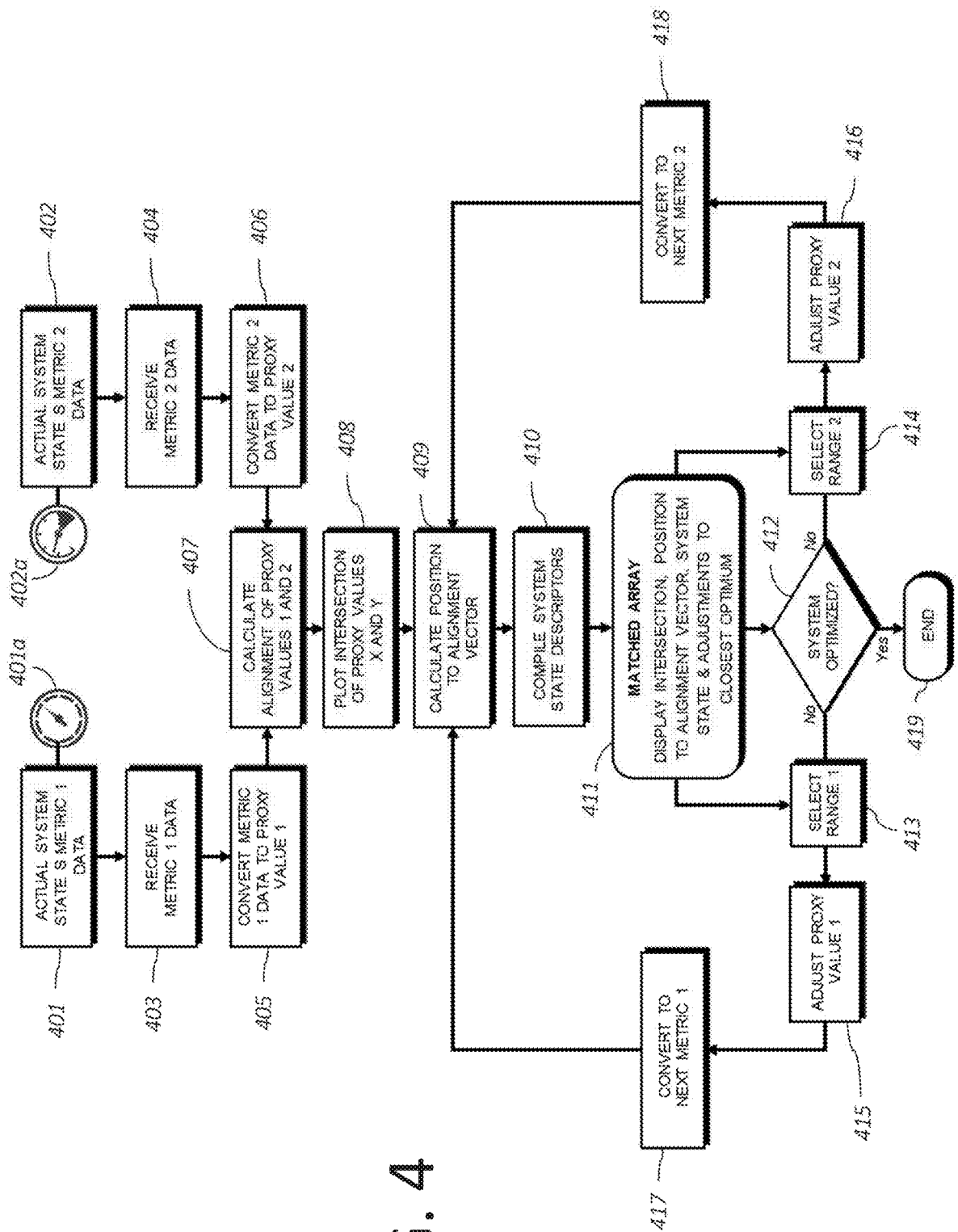
FIG. 4 is a flow chart that depicts a process in which there are inputs to and outputs from a matched array system, wherein an output from the matched array system (e.g., shown on a display device) is a set of instructions a user can follow to adjust system variables to achieve "normative" optimization, according to an embodiment.

FIG. 4 shows an embodiment of the matched array system (e.g., a computing device such as the one depicted in FIG. 10) that generates instructions an operator can follow to reach a desired target state in the underlying operating system (e.g., software executing on a computing device such as the one depicted in FIG. 10). These instructions are not implemented by the system, but represent the "normative" series of prescriptive adjustments a system operator should follow to achieve the target state as it responds to changing metric 1 and metric 2 data received. The matched array system in such an embodiment shows one or multiple steps that move from a current position toward the alignment vector. Because the alignment vector represents proxy-operating equivalence, these steps represent provisional changes that move toward optimization in the underlying operating system.

Actual operating metrics data generated by the underlying system 401 and 402 are displayed in an embodiment on the meters 401a and 402a. The alignment computer receives metric data 1 and 2 in blocks 403 and 404 in an embodiment and converts them in steps 405 and 406 to their respective proxy values. The alignment computer then calculates alignment between proxy values 1 and 2 at step 407, generating the matched array. The matched array system then plots the intersection of these values on the matched array at step 408. The matched array system then calculates at 409 the position of the resulting intersection in relation to the alignment vector on the matched array. The distance and direction of the plotted position relative to the alignment vector reflects the state of the system and the effort and direction required to achieve proxy value alignment which signals optimization or equilibrium in the underlying operating system. The matched array system state monitor (e.g., software executing on the same computing device as the matched array system) generates a compilation of system data at 410, creating a complete picture of system performance and status for review and interpretation by the system operator.

In alternate embodiments, the system state monitor 410 can show system state and performance in the form of a colored light, with different colors indicating the degree of system stability, risk, or other dimensions of performance. A more complex system state indicator on the matched array 411 can, in various alternate embodiments, generate detailed lists of original metrics, proxy values, implicated stability metrics (e.g., temperature or pressure limits approached or exceeded), recommended rate and direction of change, degrees of adjustment needed, as well as the estimated speed and time to recovery or attainment of optimization in the underlying system. The matched array system continually checks if an optimum is attained at step 412 by comparing plotted values to the alignment vector values. In an embodiment, the matched array system continues to evaluate the relative values of system variables at steps 413 and 414 to determine which is closer to the alignment vector, potentially offering the more efficient path to alignment.

Further to FIG. 4, and acting on this information, the matched array system generates normative adjustments 415 and 416 in values for proxy values 1 and 2. In an embodiment, the matched array system receives the adjusted data 415, 416 and converts the updated proxy values to new actual system metrics 417 and 418. The projected results of making such normative adjustments will be reflected in changes in position relative to the alignment vector 409. The system can continue to iterate until projected optimization threshold value is reached at step 412, at which time the matched array system will cease proposing adjustments and come to rest at 419. In this normative mode, actual changes to the actual underlying operating environment will only have been made as a result of specific actions the system operator executes in response to the matched array system instructions.

Figure 5:
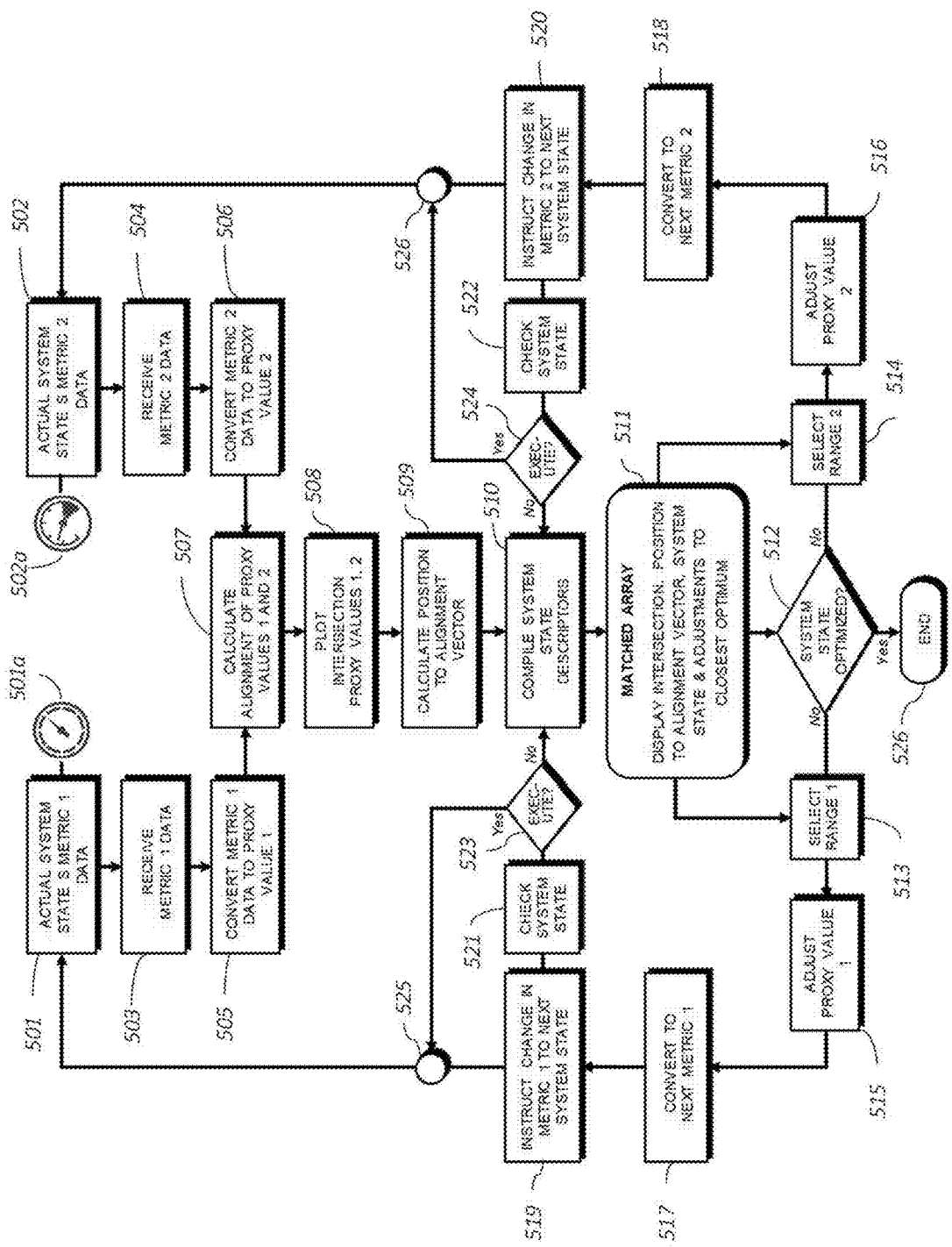
FIG. 5 is a flow chart depicting a process in which a matched array system directly instructs the physical system to take the actions dictated by the matched array position, thus automatically moving the physical system toward "positive" optimization, according to an embodiment.

Continuing to FIG. 5, note that the series of actions 501 to 518 are identical to those at blocks 401 to 418 in FIG. 4, encompassing all activities from the initial system metrics, to conversion and rendering on the matched array display, to the determination of proxy value adjustments needed to achieve optimization, and the conversion of these proxy values to updated operating metrics. Whereas the embodiment pictured in FIG. 4 stopped with directional instructions to a system operator, FIG. 5 illustrates an embodiment of the matched array system that further instructs the actual operating system to make specific underlying system adjustments consistent with approaching, and eventually reaching, the alignment vector on the matched array. Specifically, the matched array system instructs changes to underlying metrics 1 and 2, respectively, at steps 519 and 520 in line with the proxy value adjustments indicated in the matched array. In an embodiment as shown in FIG. 5, the instruction is issued but not acted upon until an operator checks the system state indicator displays 521 and 522 to view any changes that may have taken place since prior changes or from the initial state, and to review the projected impact of instructed adjustments 519 and 520 before they are executed by the matched array system.

Further to FIG. 5, in an embodiment, the system operator activates one or more switches 523 and 524, releasing the system (Yes, or preventing release, No) to make the system-proposed adjustments. If the switches are shifted to No, then the system takes no action other than to update state indicator display 510 which also captures any other changes in the system state. Alternatively, in such an embodiment, if the system operator releases the system at 523 and 524, the matched array system executes the instructions 519 and 520, and these directives are implemented in the operating system, working through the metric 1 and metric 2 actuators (or a related mechanism) 525 and 526. These adjustments generate actual system changes that move the system to a new state, causing the system to update metrics data 501 and 502. In this embodiment, the matched array system continues to receive and process actual system data, processes this information relative to proxy values, and iterates closer to the alignment vector as long as this is unimpeded by an operator instruction or internal system rule that interrupts or counters the system operation. The system will continue to process instructions to new positions in the matched array display 511, continually tracking plotted positions relative to the alignment vector. In an embodiment, the matched array system will iterate to an optimized state until the alignment vector is reached, meaning proxy value x=proxy value y, causing the switch 512 to acknowledge optimization, and ending the cycle at system stopping point 526.

Next is an application of the matched array system and alignment vector technologies applied to a critical use case of aircraft flight. Experts have argued that most pilots do not understand the relationship between airspeed and angle of attack, as evidenced by the high incidence of "loss of control" flight accidents. Angle of attack (AOA) is the angle between the oncoming air and a reference line along the fuselage or wing of an airplane. On takeoff, the pilot pulls back on the control stick or wheel to lift the nose of the aircraft so angle of attack relative to oncoming wind maximizes lift at a given airspeed. The amount of lift needed for an aircraft to achieve takeoff, to stay in flight, to maneuver, and to land, is directly related to the interaction of AOA and airspeed. While other variables enter consideration (weight which is constantly changing as fuel is consumed, aerodynamic drag, and forces exerted due to maneuvers), the "angle of attack challenge" refers to the criticality of maintaining the proper relationship between the airspeed and AOA to control lift so the aircraft gains altitude, stays aloft, or loses altitude in a controlled fashion (as in landing) as the pilot intends. The correct combinations of airspeed and AOA are essential to safe flight. When the angle of attack is too steep at a given airspeed, there is insufficient lift, resulting in a stall. Alternatively, if the angle of attack is correct, say nose down for landing, but airspeed is insufficient to maintain lift, a stall can also be precipitated causing loss of control. Accordingly, airspeed and AOA are two variables that move in tandem with one another to achieve optimal or equilibrium flight performance. Being able to visualize and adjust both together in a single instrument, as in the matched array system, would potentially avoid many loss of control accidents that occur due to the pilot's excessive focus on one instrument or flight condition (speed or AOA), rather than both together.

Figure 6:
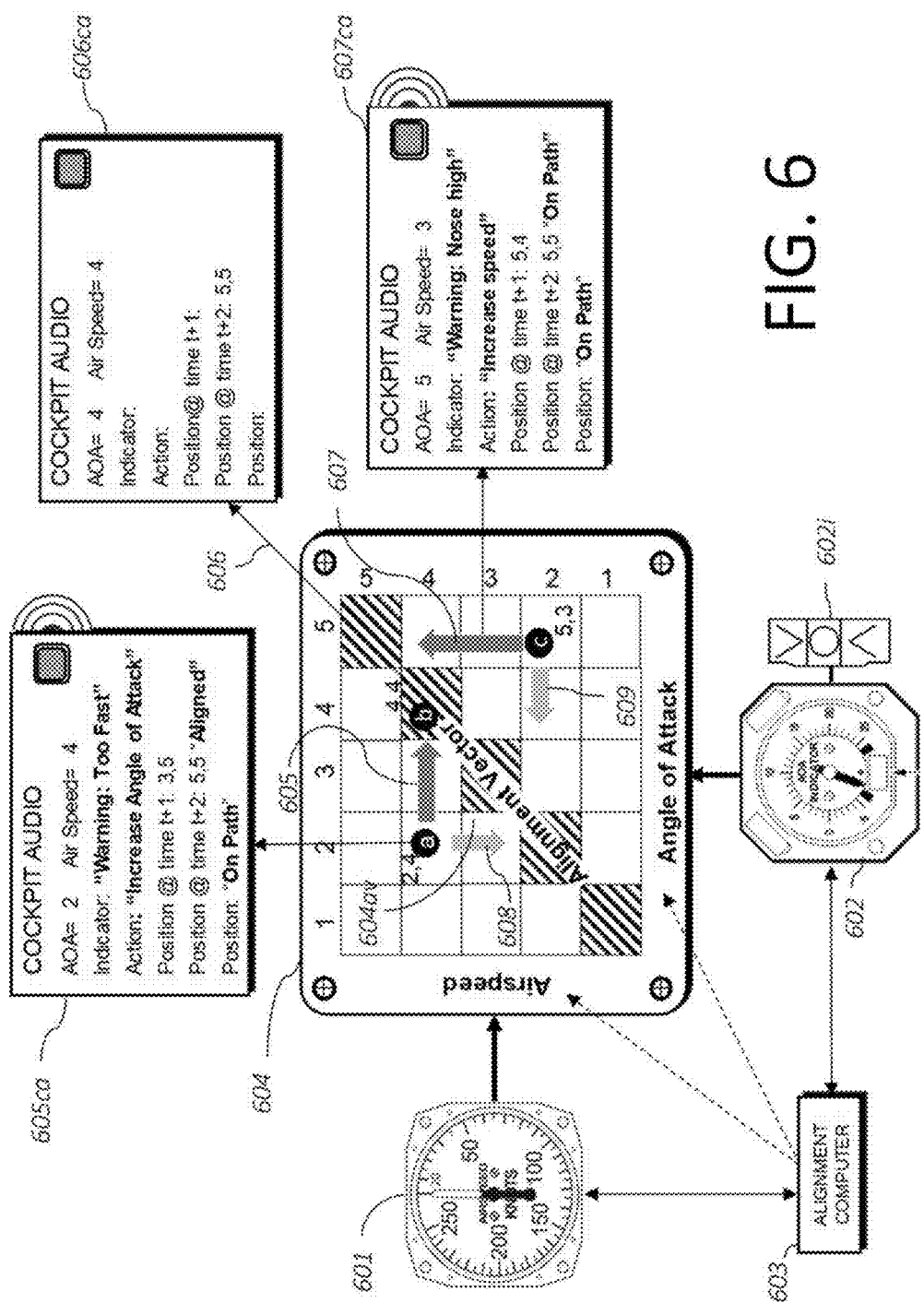
FIG. 6 illustrates an example use case for a matched array system configured according to an embodiment involving the coordination of aircraft airspeed and angle of attack.

FIG. 6 is an embodiment of matched array and alignment vector technologies (e.g., implemented on a computing device such as the one depicted in FIG. 10) applied to the combination of airspeed and AOA in a single display, enabling assignment of jointly-optimal values for both variables along the alignment vector. Among the instruments customarily installed in modern aircraft are an airspeed indicator 601 and an AOA indicator 602. The latter is sometimes accompanied by an AOA index meter 602$i$, a simple, color-coded up, down, and on-target indicator to guide the pilot to increase, decrease, or hold angle of attack to prevent a stall at a given airspeed. Airspeed and AOA already represent electronic signals that can be translated into digital inputs using the physical system process described in FIG. 1. An alignment computer 603 (which can be implemented as a separate hardware processor such as a controller or microprocessor, or as a computing device such as that shown in FIG. 10) implements the alignment computing process outlined in FIG. 3, setting the axes on the matched array, and establishing the alignment vector. The range of possible airspeeds and safe angles of attack are specific to the aircraft and incorporated; they will already have been established by a system designer, and the relevant range of each variable is input to the matched array to generate the aligned values for which takeoff, level flight, and final approach/landing scenarios are identified. Accordingly, the axes on the matched array display 604 show the proxy values x and y corresponding to the combinations of airspeed and AOA that reflect optimal and safe combinations of airspeed and angle of attack.

Continuing with FIG. 6, an airspeed/angle of attack matched array system 604 is shown, along with a set of airspeed and AOA plotted positions a, b, and c. These positions are associated with cockpit audio announcement scenarios shown in the surrounding panels 605$ca$, 606$ca$, and 607$ca$. Each scenario represents an actual airspeed-AOA combination shown on individual instruments and represented together by a single proxy value on the matched array. At position 'a,' airspeed proxy value is 4 and angle of attack proxy value is 2. Vector 605 shows a direction and range of needed adjustment that is sufficiently far from the alignment vector that cockpit annunciator 605$ca$ issues a warning with the instruction to increase angle of attack. In this embodiment, the system emits an audible warning over cockpit audio, "Warning: Too Fast," indicating too high a speed for the AOA setting, and recommending a steeper angle of attack. At position 'b,' airspeed and AOA are aligned and no adjustment is needed, so the cockpit audio system 606$ca$ does not issue any correction. At position 'c,' by contrast, the AOA is quite steep, and the airspeed too relatively slow for safe flight. As a result, the matched array system 604 causes the cockpit audio system to issue a warning at cockpit audio 607$ca$, signaling a "Warning: Nose High" condition and the associated announcement 607$ca$ to "Increase Speed."

Further to FIG. 6, arrows 608 and 609 indicate alternative pathways to returning to the alignment vector, by either reducing airspeed at vector 608 for a given angle of attack (for example, during landing) or decreasing AOA along vector 609 at a given airspeed (to maintain level flight). Which pathway represents the preferred course of action depends on the specifics of the situation. In either case, returning to the alignment vector on the matched array provides the appropriate normative guidance to the pilot on how to avoid a loss of control or return the aircraft to stable flight.

In the warning scenarios pursuant to the embodiment described, the priority of direction (to adjust airspeed or AOA) can be predetermined by the value of the metric or according to the specifics of the scenario (e.g., nose down and slowing speed for final approach and landing might prioritize AOA adjustment vs slower speed). This use case follows the normative mode of operation in which instructions are issued and no automated action taken by an associated control system. In an alternate embodiment, the matched array system can operate in positive mode, sending actual instructions to the aircraft flight control system or autopilot to actually make the indicated adjustments to the aircraft flight control surfaces. Existing aircraft autopilot systems perform this function today, automatically calculating airspeed and receiving AOA data (from instruments mounted on one or both sides of the fuselage), and adjusting either metric based on aircraft design features, specific flight characteristics, and the relevant flight conditions. However, autopilots have no corresponding display of the matched characteristics of AOA and airspeed to inform pilots of the conditions the autopilot is responding to, or to enable them to visually monitor the rate of adjustment and confirm that the autopilot is adjusting the metric in the preferred position to maintain flight control.

Figure 7:
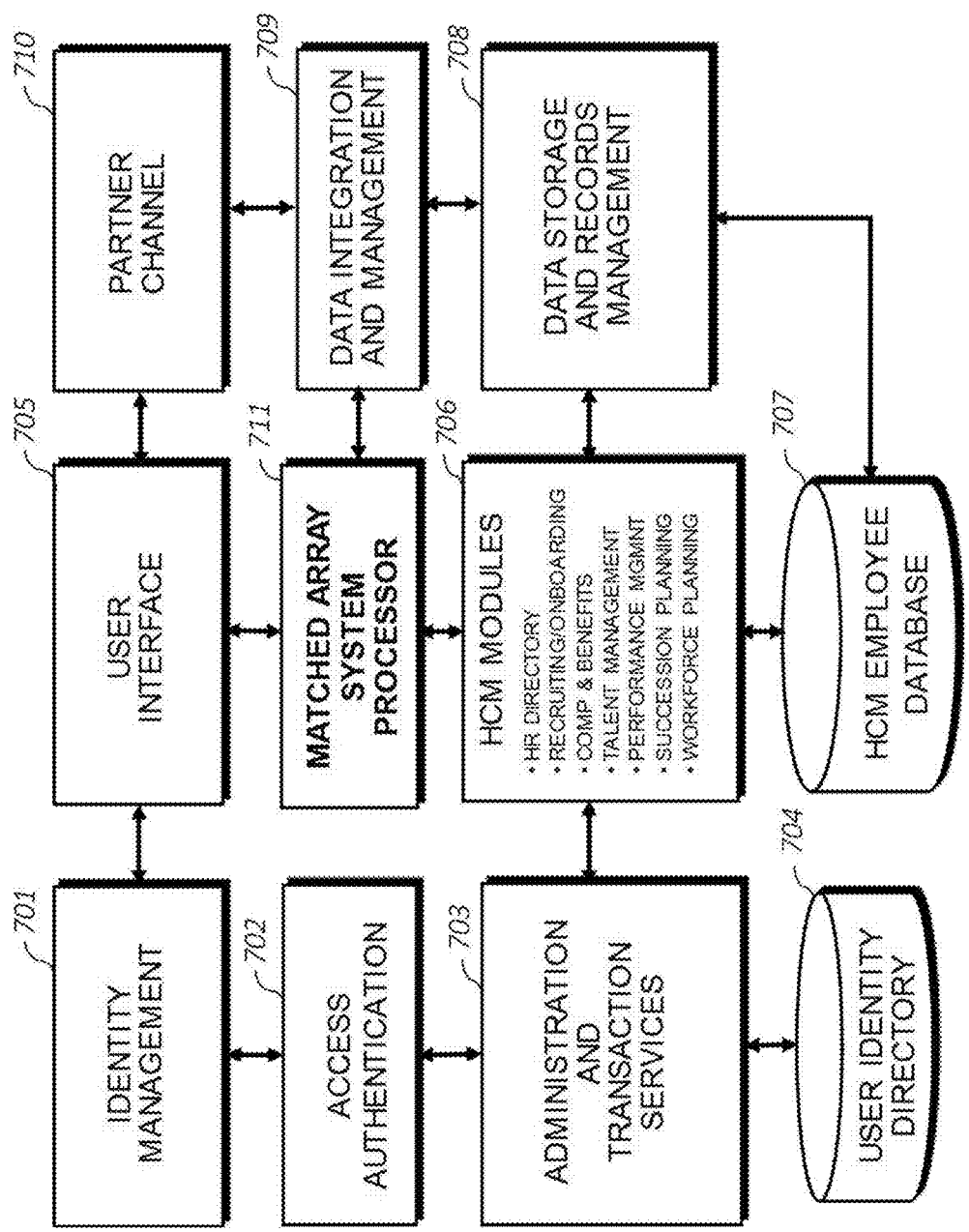
FIG. 7 shows an implementation of a matched array system in a human capital management system, according to an embodiment.

Next, FIG. 7 examines a business process case of the matched array technology applied to improving the function of a computerized human capital management (HCM) system. Human Capital Management systems are complex and powerful platforms for bringing together information about employees, ranging from administrative data such as timekeeping, pay and benefits to supporting recruitment, performance management, and workforce and succession planning. In this application, the matched array technology materially improves the HCM's performance management and workforce planning functions. Performance management is the function that helps organizations (i) set enterprise objectives; (ii) cascade those objectives down to business units, teams, and individual employees; and (iii) track individual and collective achievement of objectives. The allocation and cascading of objectives are straightforward activities. However, individual employee performance evaluation is more challenging as it depends on the skill of managers holding sometimes challenging one-on-one conversations with employees. Workforce planning is the function that helps project and strategize around the aggregate, long-term balance of the supply and demand for talent across the organization (e.g., skills, locations, volume and level of employees).

FIG. 7 is a simplified representation of a human capital management system (HCM). HCM system components 701, 702, and 703 (e.g., one or more computing devices such as that shown in FIG. 10) manage the engagement and authentication of users and the administration of their transactions, accessing directory data from the user identity directory 704. The user interface 705 enables users to access system functionality embodied in a set of HCM modules contained in core HCM component 706 and providing functionality such as recruiting and onboarding, compensation and benefits, succession planning and performance management. These modules access, manipulate, and update data in the HCM employee database 707. The modules are continually generating updated data from employee information and changes, and the records management system 708 tracks and updates these continually. Data and integration management system component 709 continually integrates and manages data across all the components. Most HCM systems also include a partner channel integration component 710 that connects and integrates applicable third-party systems, for example through an application programming interface, such as xAPI. These third-party partners include, for example, providers of assessment tools, training modules, and employee financial management tools for savings and retirement planning.

A matched array system processor 711 (which can be implemented as a separate hardware processor such as a controller or microprocessor, or as a computing device such as that shown in FIG. 10) is accessible to users, and connects with the underlying HCM modules for data extracts and updates to support its operations. Note that the partner channel 710 could be used in an embodiment of the technology to connect an HCM system to an external, partner-provided matched array technology system, enabling connectivity and integration to deliver the same functionality as the internally configured embodiment of the matched array system.

The performance management function in HCM systems typically addresses measurable employee goals such as sales targets, cost reduction goals, and completed projects that are classified as indicators of "performance." The more qualitative and behavioral objectives relevant to career advancement (such as leadership, teamwork, culture, and assertiveness) are deemed indicative of "potential." Performance is seen as more directly under the control of the employee, while potential is subject to the interpretation and control of management (given the larger context of the organization, its dynamics, and the manager's understanding of its leadership needs). Matched array technology will be described as applied to two use cases: the facilitation of individual manager-employee performance evaluation (performance management use case), and business-unit-wide evaluation of overall talent distribution and density (workforce planning use case).

The business problem in performance evaluation concerns the widely-perceived inadequacy of many frontline managers in providing meaningful, consistent, and actionable performance feedback to their direct reports. Performance in most organizations is measured in terms of the extent to which the employee "meets expectations" of the manager. Industry research notes that managers would be supported greatly by tools that provide more specific performance feedback and more meaningful and actionable advancement coaching. Matched array technology improves HCM system support of these needs by visually identifying the extent of alignment between management and employee expectations on a two-dimensional array, plotting the employee's position, and charting the direction and extent of improvement needed to approach alignment with management expectations. This alignment (meets expectations) condition reflects a performance management state in which manager and employee state are equivalent (that is, the employee is meeting manager expectations). Accordingly, proximity to the alignment vector in an embodiment can effectively communicate the degree of manager-employee alignment, and the direction and extent of change needed to close any gaps.

An additional value of matched array technology lies in addressing the talent "calibration" challenge. Differences in how individual managers evaluate their employees (e.g., more of less strictly) leads to different ratings for equivalent talent, or different ratings for the same talent when evaluated by different managers. These distinctions raise significant issues impacting compensation recommendations, assignments, and even promotions, based on possibly specious differences in assessments of an employee's capabilities, performance, and potential.

Figure 8:
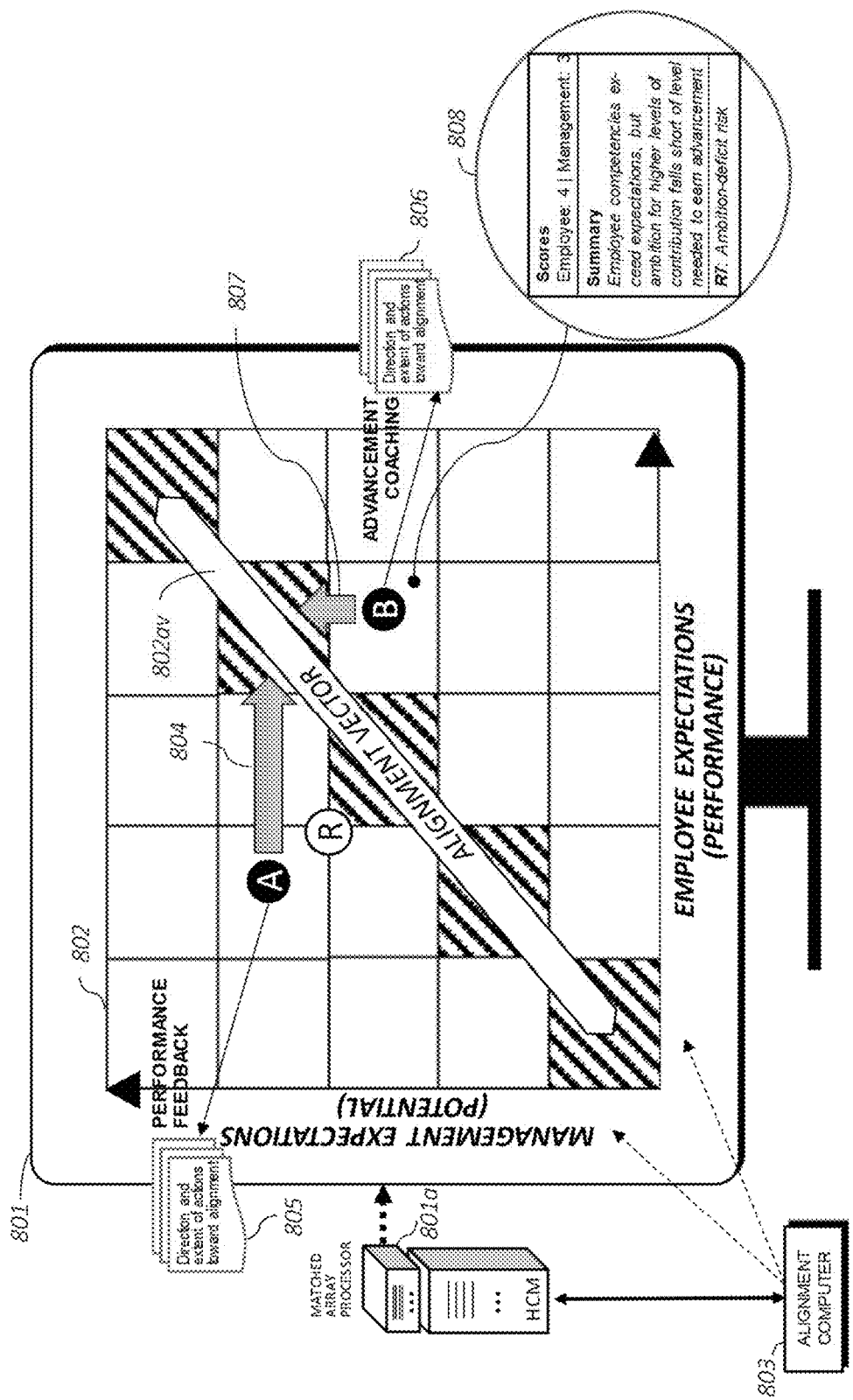
FIG. 8 shows output (on a display device) of a matched array system resulting from a human capital performance evaluation for two illustrative employees, according to an embodiment.

Supporting this use case, FIG. 8 portrays an embodiment of the matched array display technology applied to enhancing performance management functionality in an HCM system implementation. A computer monitor 801 displays output from the matched-array-enhanced HCM system 801a (e.g., a computing device such as that shown in FIG. 10), and the matched array display 802 is shown with its associated alignment vector 802av ranging along the center diagonal. Distinct X and Y axes are defined specifically through the alignment computer process 803 similar to that outlined in FIG. 3 to reflect matched terms for employee and management expectations, so the resulting alignment vector represents the points at which employee and management performance and potential expectations are aligned. In this embodiment, the correspondence between the values represented by the axes may also be presented as specific corresponding terms. For example, a management expectation of "develop" might be matched with an employee expectation of "advancement."

Information for HCM use cases can be gathered in different ways. Performance appraisal evaluations can be used to gather the information needed to inform the plotted positions. Similarly, a survey can be administered specifically to identify the employee position on the matched array using quantitative indicators that enable plotting in graduated increments that have greater precision than simple box placement indicators (e.g., a calibrated survey might show a position as (x=2.4, y=3.5). Managers armed with these statistics, with evidence for their assessments, and with ideas for improvement, can have clearer and more specific conversations about the reasons supporting the present position assessment, and the proposed direction and extent of improvement. These discussions can also result in more finely-tuned and mutually-acceptable compromises in performance appraisals that adjust plotted metrics numerically (e.g., x=2.7, y=3.5), an approach that may be preferred to changing a word in an appraisal that has a specific and important meaning in an organization's human capital management practice.

Specifically, in FIG. 8, two employees are plotted at A and B. Employee-specific identifying and classifying data information for each employee can be accessed in an embodiment by clicking on A or B on the matched array. The matched array (generated and maintained, for example, by a computing device such as that shown in FIG. 10) shows employee A has above-expectation potential (plotted above the expectations alignment vector 802av), while A's performance is below expectations (to the left of expectations alignment vector 802av). Accordingly, the associated direction and extent of improvement actions lean toward improving performance by moving employee A to the right along improvement path 804 toward the expectations alignment vector. The relative distance from the alignment vector provides a visual indicator of the degree of improvement needed, based on the axis definitions applied. A manager would review the details and evidence driving the plotted position, and potentially create a playbook 805 that includes actions appropriate for employee A's improvement. This playbook discussion could include changed behaviors, new assignments, specific commitments, training, and exposure to skill-enhancing experiences. The matched array also enables the addition of reference points such as historical markers showing employee prior plotted positions, or organization averages R based on groups of comparable employees in position for similar lengths of time. Accordingly, the employee's performance and potential can be guided by reference to her past plotted positions as well as in reference to the average of a reference set of employees.

Matched array display 802 also shows an employee B has above-expectation performance (to the right of the expectations alignment vector 802av), but below-expected potential (below the expectations alignment vector 802av). A manager would review the details and evidence driving this plotted position, and potentially create a playbook 806 that includes actions appropriate for employee B's improvement along a path 807. Here, guidance will be oriented toward improving aspects of potential, driving toward expectations alignment with vector 802av, while maintaining the existing level of performance. The shorter length of the improvement path 807 in the matched array display also indicates that the improvement in potential required of employee B is relatively modest compared to the extent of performance improvement expected of employee A. However, time and effort required to improve are employee- and path-specific.

Matched array technology and associated alignment vector optimization can use simple direct input of managers about their employees, or other established criteria. The visual presentation provides an enhanced platform for communication with the employee about the specifics of both performance and potential. By defining the alignment vector as the position at which manager and employee expectations are aligned ("meets expectations")—matched array technology provides a basis for defining expectations clearly, identifying variances to this objective position, and underscoring employee behaviors and measuring results in terms of position relative to the alignment vector. Given that current HCM systems only support and capture narrative descriptions of performance, visualizing the direction and distance-based extent of improvement needed to align expectations marks a significant and tangible enhancement of the technological capabilities of current human capital management systems.

Further to the performance management use case, an alternate embodiment of the matched array technology can assign specific characteristics to each cell of the matched array matrix 802, based on the interpretations inherent in the meaning of the axes. For example, supplementary display panel 808 shows a display of the status indicators for performance, potential, and risk associated with the employee position (generally indicated by the employee-position distance from the alignment vector 802av, and whether it is above, below, or to the right or left). In a given embodiment, this information can be accessed by clicking on the displayed cell, thus revealing the underlying content. In these and similar embodiments, axis definitions, combined with descriptions of each cell can inform the manager and employee of the current status of performance and potential, as well as the nature and extent of change needed.

Matched array technology provides a useful level of generality for assessing performance and potential that makes it applicable to a broad range of employment situations based solely on the axis definitions. And the alignment vector always represents the points at which management and employee expectations are aligned, and the cells will always have definitions that align with how the axes are defined. As a result, and since in all the embodiments, the evaluation of the plotted position is always in reference to the alignment vector, the matched array and the definition of all the content of its cells will be equally applicable in every employee-manager situation in which the axis definitions remain relevant. For example, the definition of "meets expectations" is always interpreted as alignment on the vector 802av, and will have different content, but the same implications, for a research scientist as for a financial analyst. The relevant distance and direction for similarly plotted positions will represent the same general degree and direction of improvement needed.

Figure 9:
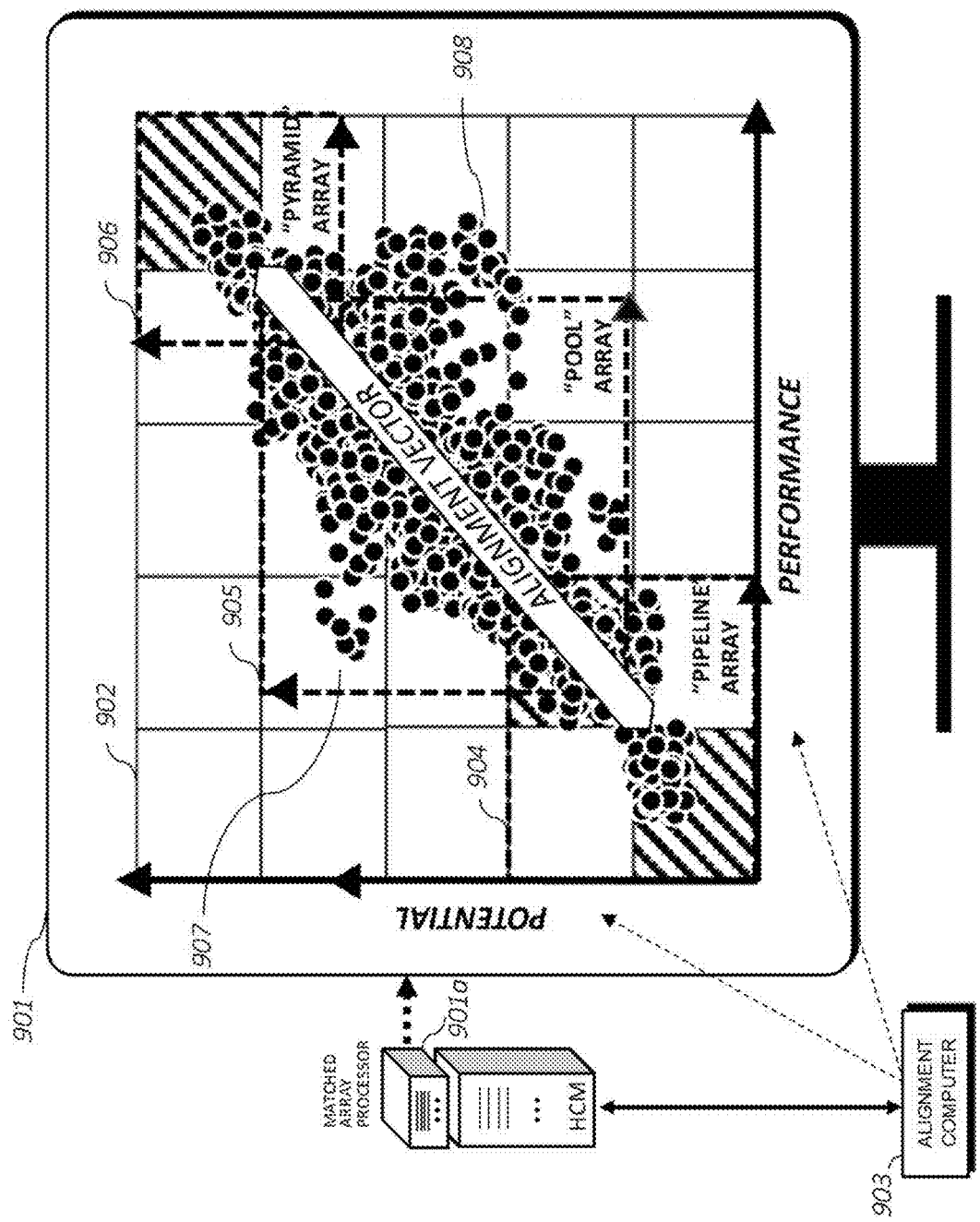
FIG. 9 shows an output on a display device in a use case for a matched array system configured according to an embodiment applied to an aggregation of employees in a human capital management system implementation, resulting in a display of the talent architecture of the organization.

FIG. 9 shows an embodiment in which matched array technology can be applied to workforce planning in an overall enterprise or organization unit. This is accomplished by compiling individual employee plots (represented by the dots on the display) into a scaled overall display, along with use of the appropriately adjusted axis definitions via alignment computer application (e.g., software executing on a computing device such as that shown in FIG. 10) at 903. Once the scaled axes are established and calibrated to the organization being assessed, the scales can be used for a range of organizations, time periods, or other settings (e.g., different functions, such as finance or marketing). Monitor 901 displays information from a matched-array-enhanced HCM system 901a. Employees are plotted directly onto a shared matched array display 902, or can be grouped into categories reflecting their relative tenure or contribution. In the embodiment shown, the matched array is composed of three such groupings of employees: entry-level talent in "pipeline array" 904, mature and stable talent in the "pool array" 905, and high-potential leadership or growth talent in the "pyramid array" 906.

Displaying talent together in a matched array scaled to represent such an aggregation provides an overall portrait of the organization's "talent architecture," defined as the pattern and alignment of talent in response to workforce policies, processes, and practices. This talent architecture view enabled by matched array technology can show rich and novel detail, such as the current density and distribution of talent, visual perspectives on the adequacy of recruiting efforts in pipeline array 904, and the availability of leadership talent in the pyramid array 906. In the center lies the bulk of the organization's talent at pool array 905, which can be analyzed for turnover, inbound replacements, feeding of talent to advancement opportunities, and overall quality (based on proximity to the alignment vector).

Moreover, talent architecture represented on the matched array can detail the relative dispersion of the talent around the alignment vector providing an indication of relative talent quality and measures of risk. For example, although a stable core of employees would ordinarily populate the pool array, the small group of employees a plotted group 907 is falling significantly short of performance expectations and poses a termination risk if their performance cannot be rapidly and substantially improved. By contrast, employees at plotted group 908 reflect a group of outstanding performers who pose a retention risk, as management—despite their performance—has not rated them as having sufficient potential for advancement; they may easily be lost to other employers. Finally, over time, the matched array and alignment vector technologies provide a way of tracking and measuring the organization's leadership "yield." Leadership yield is the rate and volume at which talent traverses from pipeline to pool to pyramid, reflecting the organization's capacity to produce, grow, and retain the leaders it needs to run the organization. None of this information is provided in typical HCM systems.

While modern HCM system workforce planning functionality addresses planning for the type and volume of skills the organization will need by role, organization, and location, matched array technology provides a view of the overall architecture dynamics (distribution, density, risks, and yield) of talent that adds richness, clarity, and enhanced diagnostic insight into these dynamics by providing a visual and composite display. Customary, high-technology HCM-based workforce planning cannot begin to approach this level of depth and insight. The most closely-related HCM practice, "organization design," requires a costly analysis and research effort (studying each employee's evaluation rating) to generate the insights that are immediately accessible through this talent architecture view. Matched array and alignment vector technologies give leaders a better-informed and more easily understood perspective on the entire landscape of talent at a glance, in contrast to pouring over reams of workforce planning printouts and individual employee performance evaluations.

In an embodiment, a first set of inputs into the system of FIG. 9 is received from a first client computing device (entered via a user interface of the first client computing device) and a second set of inputs into the system of FIG. 9 is received from a second client computing device (entered via a user interface of the first client computing device).

Turning to FIG. 10, a computing device on which the techniques described herein may be carried out is shown. The computing device, generally labelled 1000 includes logic circuitry 1002 (e.g., one or more microprocessors, microcontrollers, application-specific integrated circuits, or field-programmable gate arrays), a primary memory 1004 (e.g., volatile memory, random-access memory), a secondary memory 1006 (e.g., non-volatile computer-readable media), user input devices 1008 (e.g., a keyboard, mouse, or touchscreen), a display 1010 (e.g., an organic, light-emitting diode display), and a network interface 1012 (which may be wired or wireless). The memories 1004 and 1006 store instructions and data. The logic circuitry 1002 executes the instructions and uses the data to carry out various procedures including, in some embodiments, the methods described herein.

It should be understood that the embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope.

What is claimed is:

1. A method for displaying talent values in a two-dimensional array, the method, implemented on a system including at least one display device and at least one input device, comprising:

displaying a grid of cells of an array on the at least one display device;

displaying, on the at least one display device, an X-axis of proxy values for talent metrics of an organization adjacent to the grid and a Y-axis of proxy values for corresponding talent metrics of an employee of the organization adjacent to the grid;

receiving, by the at least one input device, an input of a first metric reflecting a talent value of the employee from a perspective of the management of the organization;

scaling the first metric to convert the first metric into a first proxy value;

receiving, by the at least one input device, an input of a second metric reflecting a talent value of the employee from a perspective of the employee;

scaling the second metric to convert the second metric into a second proxy value; and on the at least one display device, displaying, in a cell of the array that corresponds to an intersection of the first proxy value and the second proxy value on the grid formed by the X-axis and the Y-axis, a plotted talent position of the employee, wherein the plotted talent position visually indicates a distance between the plotted talent position and an alignment vector of the grid, wherein the alignment vector represents alignment between the talent values defined by cells of the two-dimensional array for which the first proxy value is equivalent to the second proxy value.

2. The method of claim 1, wherein the method is implemented on a human capital management system.

3. The method of claim 1, wherein the at least one input device comprises a first user interface for receiving the first metric, and a second user interface for receiving the second metric.

4. The method of claim 1, wherein the at least one input device receives one or more talent survey data inputs.

5. The method of claim 1, wherein the at least one input device receives one or more analytical data inputs.

6. The method of claim 1, wherein the plotted talent position visually indicates that the cell is within the alignment vector.

7. The method of claim 1, wherein the plotted talent position visually indicates that the cell is not within the alignment vector.

8. The method of claim 7, further comprising prompting the management or the employee or both to change one or both of the first metric and the second metric.

9. The method of claim 8, wherein the cell is a first cell, the method further comprising:

receiving, by the at least one input device, an input of an updated first metric;

scaling the updated first metric to convert the updated first metric into an updated first proxy value;

removing the plotted position from the first cell;

on the at least one display device, displaying, in a second cell of the array, an updated plotted talent position of the employee in the second cell of the array;

wherein the second cell corresponds to an intersection of the updated first proxy value and the second proxy value on the grid formed by the X-axis and the Y-axis; and wherein the updated plotted talent position visually indicates an updated distance between the second cell and the alignment vector.

10. The method of claim 9, wherein the updated plotted talent position of the second cell is closer to the alignment vector than the first cell.

11. The method of claim 9, wherein the updated plotted talent position of the second cell is farther away from the alignment vector than the first cell.

12. The method of claim 9, wherein the updated plotted talent position of the second cell is within the alignment vector, indicating alignment between the talent values from the perspective of the management and the talent values from the perspective of the employee.

13. The method of claim 1, wherein the proxy values for talent metrics of the organization are displayed on the Y-axis, and the proxy values for corresponding talent metrics of the employee are displayed on the X-axis.

14. A method for identifying a change needed to align talent values in a two-dimensional array, the method, implemented on a system including at least one display device and at least one input device, comprising:

displaying a grid of cells of an array on the at least one display device;

displaying, on the at least one display device, an X-axis of proxy values for talent values of an organization adjacent to the grid, and a Y-axis of proxy values for talent values of an employee of the organization adjacent to the grid;

receiving, by the at least one input device, an input of a first talent metric;

scaling the first talent metric to convert the first talent metric into a first proxy value;

receiving, by the at least one input device, an input of a second talent metric;

scaling the second talent metric to convert the second talent metric into a second proxy value;

on the at least one display device, displaying, in a cell of the array that corresponds to an intersection of the first proxy value and the second proxy value on the X-axis and the Y-axis, a plotted talent position of the employee, and an indicator that visually indicates a distance between the cell and an alignment vector of the grid;

wherein the alignment vector is defined by cells of the two-dimensional array for which the first proxy value is equivalent to the second proxy value, and wherein the distance between the cell and an alignment vector visually represents the extent of change needed in either or both the first or second talent metrics to achieve alignment between management and employee talent values.

15. The method of claim 14, wherein the plotted talent position of the employee relates to the performance and potential of the employee.

16. The method of claim 14, wherein the talent values of the employee are displayed with respect to the X-axis, and the talent values of the organization are displayed with respect to the Y-axis.

17. The method of claim 14, wherein a horizontal distance to the alignment vector represents a prompted change in the employee talent value; and wherein, a vertical distance to the alignment vector represents a prompted change in the management talent value.

18. The method of claim 14, wherein a horizontal distance to the alignment vector represents a prompted change in the management talent value; and wherein, a vertical distance to the alignment vector represents a prompted change in the employee talent value.

19. The method of claim 14, wherein cells on the grid also display plotted talent positions of the employee from earlier appraisals for the employee.

20. A computing device, including at least one input device and at least one display device, configured to:

display a plurality of cells of an array on the at least one display device, wherein each cell of the plurality corresponds to a different set of values of a first metric corresponding to talent metrics of an organization and a second metric corresponding to talent metrics of an employee of the organization;

receive, by the at least one input device a first input which represents a talent value of the employee from a perspective of management of the organization for the first metric and a talent value of the employee from a perspective of the employee for the second metric;

scale the value of the first metric of the first input to a first proxy value;

scale the value of the second metric of the first input to a second proxy value;

determine a first cell of the plurality of cells that corresponds to the first proxy value and to the second proxy value;

provide, within the first cell of the at least one display device, a visual indicator indicating that the first cell is not within an alignment vector, wherein the alignment vector is defined by cells of the array for which the first proxy value equals or aligns with the second proxy value;

receive, by the at least one input device a second input which represents a talent value of the employee from the perspective of management of the organization the first metric and talent value of the employee from the perspective of the employee for the second metric, wherein at least one of the values for the first metric and second metric is changed from the first input to the second input;

scale the value of the first metric of the second input to a first proxy value;

scale the value of the second metric of the second input to a second proxy value;

after receiving the second input, determining a second cell of the plurality of cells that corresponds to the first proxy value and to the second proxy value; and providing, within the second cell on the at least one display device, a visual indicator indicating that the second cell is within the alignment vector.

21. A system comprising the computing device of claim 20, a first client computing device from which the first input is received via a user interface of the first client computing device and a second client computing device from which the second input is received via a user interface of the second client computing device.

* * * * *